United States Patent [19]

Brauer

[11] Patent Number: 4,504,941

[45] Date of Patent: Mar. 12, 1985

[54] STYLUS CARTRIDGE HAVING STYLUS ARM RESTRAINT

[75] Inventor: Eric A. Brauer, Danville, Ind.

[73] Assignee: RCA Corporation, New York, N.Y.

[21] Appl. No.: 461,892

[22] Filed: Jan. 28, 1983

[51] Int. Cl.³ .............................. G11B 1/00; G11B 9/06
[52] U.S. Cl. ..................................... 369/170; 369/126; 369/151
[58] Field of Search .................... 369/170, 126, 151

[56] References Cited

U.S. PATENT DOCUMENTS

| 4,339,812 | 7/1982 | Goto | 369/170 |
|---|---|---|---|
| 4,342,394 | 8/1982 | Taylor | 369/170 |
| 4,404,670 | 9/1983 | Taylor | 369/170 |
| 4,410,976 | 10/1983 | Uchida et al. | 369/170 |
| 4,413,334 | 11/1983 | Goto | 369/170 |
| 4,442,517 | 4/1984 | Braur | 369/170 |

*Primary Examiner*—Steven L. Stephan
*Attorney, Agent, or Firm*—Paul J. Rasmussen; William H. Meise; Dilip A. Kulkarni

[57] ABSTRACT

The stylus arm restraint comprises an element disposed substantially perpendicular to the stylus arm, and having a portion that is received in a recess provided in the cartridge housing when the stylus arm is held inside the cartridge. The reception of the stylus arm-mounted element in the cartridge recess limits motion of the stylus arm during transit.

3 Claims, 3 Drawing Figures

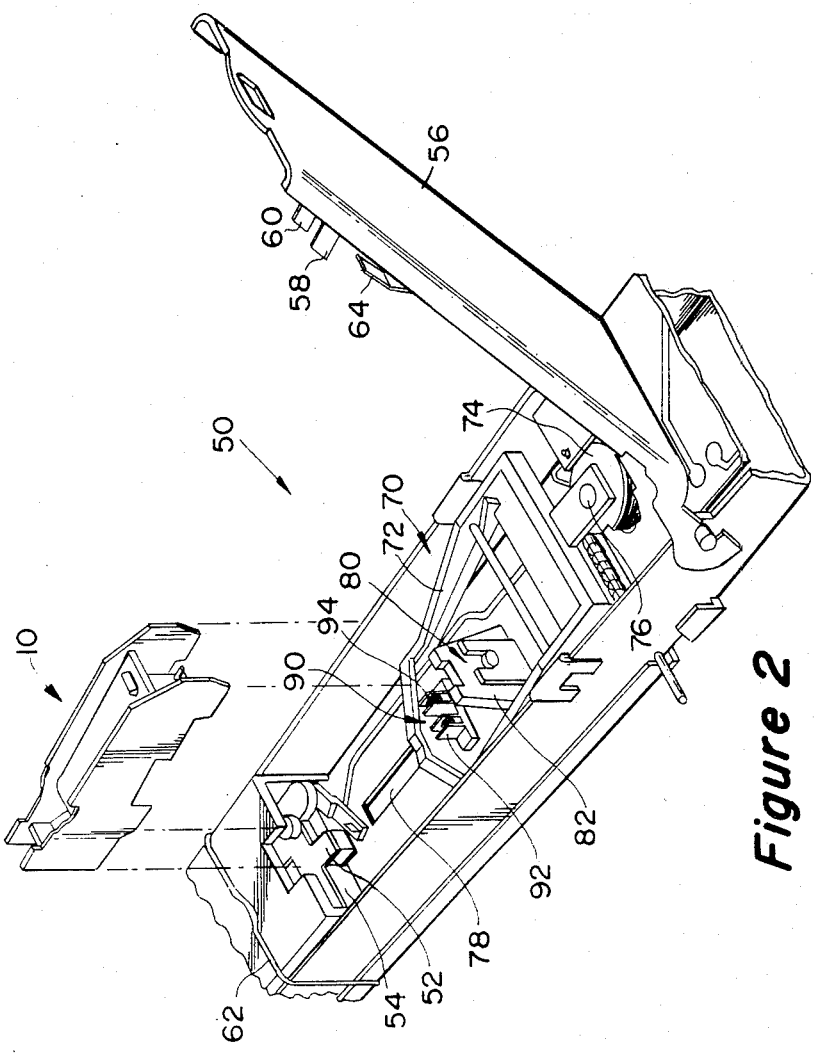

STYLUS CARTRIDGE HAVING STYLUS ARM RESTRAINT

This invention relates to a pickup cartridge, and more particularly, to a means for protecting the stylus arm assembly during handling and shipping.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the abovementioned capacitance-type system uses a spirally-grooved information track with a groove density of nearly 10,000 grooves per inch (groove width=approximately 2.5 micrometers). During playback, the stylus tip is received in the groove and guided toward the record center as a turntable-supported record revolves at the desired speed. The microscopic groove geometries requires a stylus that has rather fine dimensions (e.g., stylus tip width=2 micrometers, stylus tip length=5 micrometers and stylus tip height=3 micrometers).

The pickup stylus is typically housed in a protective cartridge. The stylus is disposed at one end of a stylus arm. The other end of the stylus arm is freely suspended in a cartridge housing by a thin rubber suspension, about 0.015 inches thick, such that the stylus arm is free to move axially, laterally and vertically. The stylus arm is wedged in a centering groove provided in the cartridge housing by a pair of retaining fingers to prevent vertical and lateral motion of the stylus arm. A leaf spring (or a flylead) has one end secured to the stylus, and its other end too the cartridge housing. The flylead provides the stylus/record engagement force, and also serves as the electrical connection between the stylus and the signal processing circuits of a video disc player.

The stylus cartridge is inserted into a carriage translatably in the video disc player. When the cartridge is thus installed in the carriage, the stylus arm retaining fingers are automatically spread apart to release the stylus arm. The stylus arm rests on a stylus arm support bracket when freed from the cartridge retaining fingers as will become clear later. The bottom wall of the carriage has an opening through which the stylus is selectively lowered onto a turntable-supported record for playback. The carriage is driven to cause it to follow the radially inward motion of the groove-guided stylus.

A mechanism is housed in the carriage for selectively lifting and lowering the stylus. The stylus lifter mechanism includes a stylus arm support bracket, which is pivotally mounted in the carriage for motion between a raised position, where the stylus arm is lifted into the carriage against a stop in the cartridge, and a lowered position, where the stylus arm is allowed to extend through the bottom wall of the carriage to contact a turntable-monted record.

Also located in the carriage is a groove skipper comprising a permanent magnet disposed substantially perpendicularly to the stylus arm, and a pair of air-core coils mounted in the carriage housing on the opposite sides of the perpendicular magnet. The air coils are connected such that, upon energization, they generate aiding magnetic fields. The permanent magnet is so dimensioned that one of its poles—e.g., north pole—is interposed between the coils when the stylus arm is lowered for playback. The stylus arm is displaced inward or outward depending upon the polarity of the actual pulse applied to the air coils. The groove skipper serves a multitude of functions—such as locked groove clearance, rapid visual search, etc. The details of the groove skipper are given in U.S. Pat. No. 4,258,233, issued to Simshauser.

Further mounted in the carriage is an armstretcher mechanism including a permanent magnet mounted to the stylus arm parallel to its axis, and an electromagnet disposed in carriage adjacent to it. When signals are applied to the armstretcher electromagnet, it produces a magnetic field which interacts with the stylus arm-mounted, axial magnet to cause front-to-back motion of the stylus arm in a manner opposing the cyclical errors in the stylus/record relative velocity during playback. A suitable armstretcher mechanism is described in detail in a commonly-assigned U.S. patent application, Ser. No. 366,644, filed in behalf of Taylor et al.

It is desirable to protect the stylus assembly during handling and shipping. The vibrations produced during transmit might result in axial movement of the stylus arm, thereby creating the possibility of damaging the stylus.

In accordance with this invention, the cartridge housing is provided with a recess in which a portion of the skipper magnet is received when the stylus arm is held in the raised position to limit the front-to-back motion of the stylus arm, thereby protecting the stylus during transit.

In the drawings:

FIG. 2 is a perspective view of a stylus carriage in which the FIG. 1 cartridge is installed.

Figure 1:
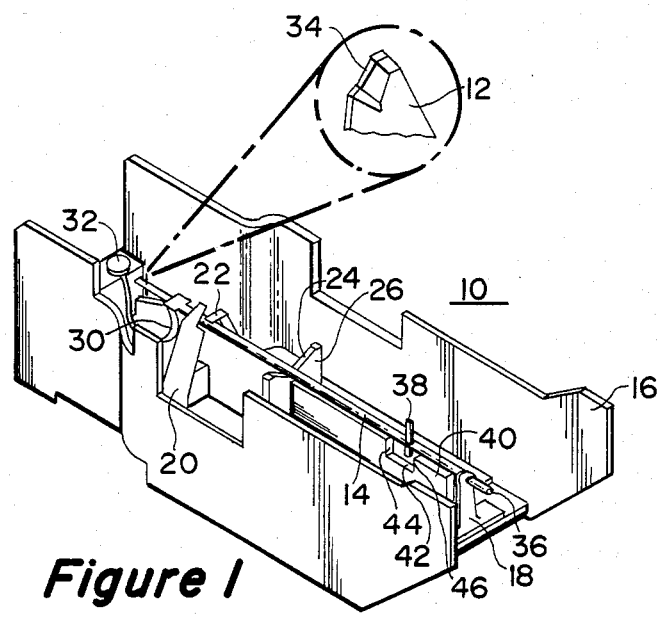
FIG. 1 illustrates a perspective view of a pickup cartridge, shown upside down, incorporating the stylus arm restraint device in accordance with this invention.

FIG. 1 is a stylus cartridge 10, shown in an inverted position, incorporating the stylus arm restraint feature of the subject invention. A pickup stylus 12 is disposed at one end of a stylus arm 14 in the form of a hollow aluminum tube with the following dimensions: length=1.654 inches, outside diameter=0.044 inches, and thickness=0.004 inches. The other end of the stylus arm 14 is freely suspended in the cartridge housing 16 by a rubber suspension 18, about 0.015 inches thick, such that the stylus arm is free to move axially, laterally and vertically. The cartridge 10 is fitted with a pair of retaining fingers 20 and 22, which hold the stylus arm 14 in a centering groove 24 provided in a stop 26, which is integrally molded with the cartridge housing 16. When held in this fashion, the stylus arm 14 is restrained from side-to-side and up-and-down excursions.

A flylead 30, about 0.000560 inches thick, has one end secured to the stylus arm 14. The other end of the flylead 30 is fixedly attached to a terminal 32 disposed on the cartridge housing 16. The flylead 30 provides electrical connection between a stylus-mounted electrode 34, approximately 0.2 micrometers deep, and the pickup circuits 54 housed in the stylus carriage 50 when the cartridge 10 is mounted therein, as will be seen later. The flylead 30 additionally serves to provide stylus/record engagement force during play.

Mounted within the hollow aluminum tube 14, and arranged parallel to its axis, is an elongated armstretcher magnet 36. Disposed further on the stylus arm 14, and at right angles to it, is a stylus skipper magnet 38. Both of these magnets can be attached to the stylus arm 14 in any suitable manner. For example, they can be press fitted into the stylus arm tube, or inserted therein and then glued in place. Both the armstretcher and the skipper magnets have identical dimensions: length=0.130 inches and cross-section 0.025 square inches. The armstretcher mechanism 80 and the skipper mechanism 90 are both housed in the carriage 50, and will be described later.

As previously indicated, it is desirable to protect the delicate cartridge components during handling and shipping. The cartridge retaining fingers 20 and 22 hold the stylus arm 14 in the centering groove 24 disposed in the downwardly depending stop 26 when the pickup cartridge 10 is outside the video disc player. When held in this fashion, the lateral and vertical motion of the stylus arm 14 is restricted.

Not only is it desirable to restrict the lateral and vertical motion of the stylus arm 14, but it is important to limit the axial motion thereof. To this end, in accordance with this invention, the cartridge housing 16 is provided with a downwardly depending wall 40 having a cutout 42 in which a portion of the skipper magnet 38 is received when the stylus arm 14 is held up against the stop 26. The axial motion of the stylus arm 14 is restricted to the clearance between the vertical walls 44 and 46 defining the cutout 42 to prevent damage to the stylus 12, etc.

The cartridge 10 is installed in a carriage 50 shown in FIG. 2. Upon installation, the terminal 32 disposed on the cartridge housing 16 contacts a terminal 52 of the pickup circuit board mounted on a resonator block 54. When the carriage lid 56 is closed, a pair of depending tabs 58 and 60 disposed thereon defeat the cartridge retaining fingers 20 and 22 to release the stylus arm 14. The carriage 50 is fitted with a wire hoop 62 to lock the lid 56 shut. A leaf spring 64, attached to the underside of the carriage lid 56, firmly seats the cartridge 10 in the carriage 50 when the lid is securely locked.

Housed in the carriage 50 is a stylus lifter mechanism 70 comprising a pivotally-mounted, stylus arm support bracket 72, and an electromagnet 74. The stylus arm 14 rests on the lifter support bracket 72 as the cartridge retaining fingers 20 and 22 are spread apart upon insertion of the cartridge 10 in the carriage 50. When the lifter electromagnet 74 is actuated, a permanent magnet 76 attached to the lifter bracket 72 is repelled to cause the bracket to gently lower the stylus 12 through an opening 78 in the carriage 50 onto a turntable-mounted record. The lifter bracket 72 is held in the raised position by a spring (not shown) when the player is turned off and the carriage 50 is returned to its home position. U.S. Pat. No. 4,266,785 describes a suitable stylus lifter mechanism of this type.

An armstretcher mechanism 80, which is located in the carriage 50, comprises an electromagnet 82 and the axial magnet 36 mounted inside the stylus arm tube 14. The armstretcher electromagnet 82 creates forces on the axial magnet 36 to cause to-and-fro excursions of the stylus 12 in a manner offsetting cyclical errors in the stylus/record relative velocity during playback. A more detailed description of the armstretcher mechanism can be found in the aforesaid U.S. patent application of Taylor et al.

Further mounted in the carriage 50 is a stylus skipper mechanism 90 including a stylus arm-mounted, perpendicular magnet 38, and a pair of Helmholtz air coils 92 and 94. When energized, the air coils 92 and 94 displace the stylus 12 across the record to, for example, clear a locked groove condition. U.S. Pat. No. 4,258,233 gives specifics of the stylus skipper mechanism.

Figure 3:
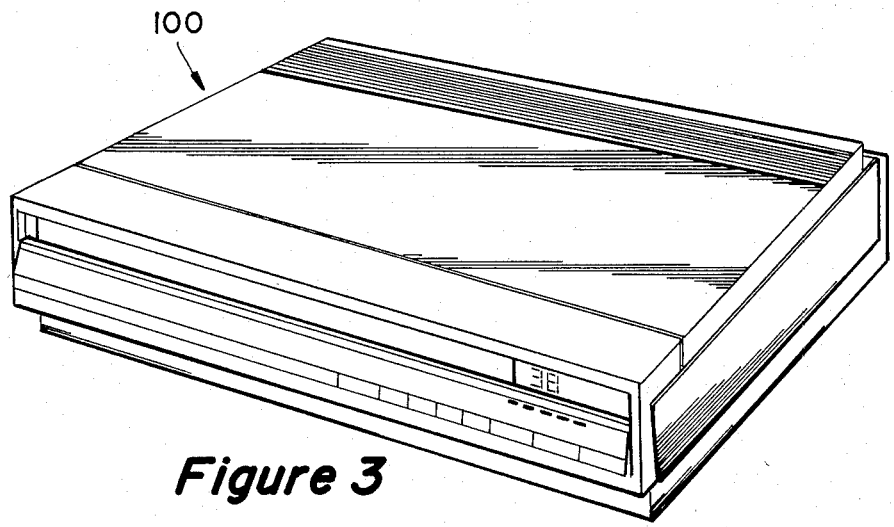
FIG. 3 depicts a video disc player in which the stylus carriage of FIG. 2 is translatably mounted.

The pickup carriage 50 is translatably mounted in the video disc player 100 shown in FIG. 3. During handling and shipment of the video disc player 100, it is possible that a shock can cause the stylus 12 to move forward, and impact on the resonator block 54 in the carriage 50. The stylus restraint feature of the present invention prevents possible damage to the stylus 12 by limiting the axial displacement of the stylus arm 14. It will be noted that the subject invention protects the stylus 12 not only when the cartridge 10 is located outside the player 100, but also when it is mounted in the player.

What is claimed is:

1. In a stylus cartridge including a housing; a stylus arm having an axis and carrying a stylus at one end thereof; a compliant member freely suspending the other end of said stylus arm in said cartridge housing such that said stylus arm is free to move axially, laterally and vertically; a stop having a centering groove arranged substantially parallel to said stylus arm axis; means for biasing said stylus arm in said centering groove to prevent side-to-side and up-and-down motion of said stylus arm; wherein the improvement comprises:
   (A) an element disposed on said stylus arm substantially at right angles to its axis; and
   (B) a recess provided in said cartridge housing for receiving a portion of said element when said stylus arm is held against said stop to limit front-to-back excursions of said stylus arm.

2. The stylus cartridge as set forth in claim 1 further including a flylead having one end secured to said cartridge housing and the other end to said stylus.

3. The stylus cartridge as defined in claim 1 for use with a player having a stylus skipper mechanism comprising a magnetic element attached to said stylus arm and an electromagnet arranged in said player adjacent to said magnetic element; said electromagnet causing lateral displacement of said stylus arm when energized; the magnitude of said stylus displacement depending upon the amplitude of the electrical pulse applied to said electromagnet; the direction of said stylus displacement being the function of the polarity of said pulse; said magnetic element of said skipper mechanism additionally serving as said stylus arm-mounted element having a portion extending into said recess in said cartridge housing for limiting the axial travel of said stylus arm.

* * * * *